(12) United States Patent
Bruce

(10) Patent No.: US 6,205,719 B1
(45) Date of Patent: Mar. 27, 2001

(54) EASY-TO-INSTALL ROOF SCREEN SYSTEM

(75) Inventor: Ryan W. Bruce, Scotts Valley, CA (US)

(73) Assignee: Royal Roofing Co., Inc., San Jose, CA (US)

( * ) Notice: Subject to any disclaimer, the term of this patent is extended or adjusted under 35 U.S.C. 154(b) by 0 days.

(21) Appl. No.: 09/558,726

(22) Filed: Apr. 26, 2000

(51) Int. Cl.⁷ .................................................. E04H 12/20
(52) U.S. Cl. ............................... 52/147; 52/146; 52/710; 248/62; 403/373; 411/85
(58) Field of Search ................................... 52/127.2, 146, 52/147, 712–713, 710; 248/62, 59, 74.1–74.4; 24/279, 459; 403/52, 56, 57, 65, 373, 374.1, 374.2, 374.3, 344, 326–330; 411/84, 85, 437, 427

(56) References Cited

U.S. PATENT DOCUMENTS

| | | | |
|---|---|---|---|
| 3,415,473 | * 12/1968 | Ollen | 248/59 |
| 3,532,311 | * 10/1970 | Havener | 248/62 |
| 4,207,014 | * 6/1980 | Worrallo | 403/344 |
| 4,572,694 | * 2/1986 | Hoeksema | 403/187 |
| 4,708,554 | * 11/1987 | Howard | 52/710 X |
| 4,783,040 | * 11/1988 | Lindberg et al. | 411/85 X |
| 5,862,637 | 1/1999 | Bruce . | |
| 5,893,538 | * 4/1999 | Onishi et al. | 411/84 X |
| 5,941,653 | * 8/1999 | Cipriani | 403/373 X |

* cited by examiner

Primary Examiner—Richard Chilcot
(74) Attorney, Agent, or Firm—Robert Charles Hill

(57) ABSTRACT

A roof screen system comprises a number of triangular frames assembled from aluminum beams held together with pivotable clamps. Such clamps also bolt down onto roof footers with flashing boots that prevent roof leaks. A number of clips are attached to the upright triangular frames. Horizontal rails are then attached with the clips to the triangular frames, and screen panels are hung and attached to the rails. The pivotable clamps allow a slip-connection anywhere along the aluminum beams that can be locked down with ordinary wrenches. As such, the screen panels can be tilted back or forward to accommodate painted signs, electric signs, advertising, and even solar photovoltaic panels.

16 Claims, 3 Drawing Sheets

EASY-TO-INSTALL ROOF SCREEN SYSTEM

BACKGROUND OF THE INVENTION

1. Field of the Invention

The present invention relates to roof screens used to hide mechanical equipment on building roof tops, and more particularly to roof screen systems that elevate a frame on weatherproof roof footers and allow sheet metal screening to be attached like fencing panels.

2. Description of Related Art

Roof screen systems are walls or facades built on commercial building rooftops to conceal roof mounted mechanical equipment. Also commonly referred to as "equipment screens" and "screen walls". Conventional construction typically comprises wood and sheet metal framing and paneling components fastened together with nails or screws and supported by wood "sleepers" bolted through the roof. These conventional systems have a relative short service life and are notorious for being the source of roof leaks.

A roof screen system is described by the present inventor, Ryan W. Bruce, in U.S. Pat. No. 5,862,637, issued Jan. 26, 1999. Such system allows an architectural screen on top of a building to be secured to the roof. Air conditioning and heating units can then be put out of view from street level. The frames and footings used for these screens must be very strong to resist the tremendous lateral forces imposed by winds and gusts. Horizontal, vertical, and diagonal lengths of galvanized-steel angle-iron are welded into a triangle frame. Several parallel frames are all aligned on a rooftop and supported by round tubular feet with flat pads that lag-bolt to the roof. The screening bolts like a panel fence to the vertical sides of each frame, so the rest of the frame is inside behind the screen out of view. Special rain and weather flashings are slipped over the footings before the frames are attached. Such flashing is sealed to the footing and roof to prevent leaks that could develop due to the lag-bolts.

A similar roof screen system is marketed under the VIEWGUARD trademark by Royal Roofing Company, Inc. (San Jose, Calif.). This experience has resulted in seeing a number of ways that the prior art systems can be improved. For example, the galvanized steel material and the requirement for welding during assembly have been eliminated. Pitched roofs complicated the installation by requiring special cutting and welding.

SUMMARY OF THE INVENTION

An object of the present invention is to provide improved methods and materials for roof screens.

Briefly, a roof screen system embodiment of the present invention comprises a number of triangular frames assembled from aluminum beams held together with pivotable clamps. Such clamps also bolt down onto roof footers with flashing boots that prevent roof leaks. A plurality of parallel horizontal rails are attached to the triangular frames with clips, then bolted to the backs of screen panels. The pivotable clamps allow a slip-connection anywhere along the aluminum beams that can be locked down with ordinary wrenches. As such, the screen panels can be tilted back or forward to accommodate painted signs, electric signs, advertising, and even solar photovoltaic panels.

An advantage of the present invention is that a roof screen system is provided that is lightweight, weather-resistant, maintenance-free, and water-tight.

The above and still further objects, features, and advantages of the present invention will become apparent upon consideration of the following detailed description of specific embodiments thereof, especially when taken in conjunction with the accompanying drawings.

DETAILED DESCRIPTION OF THE INVENTION

Figure 1:
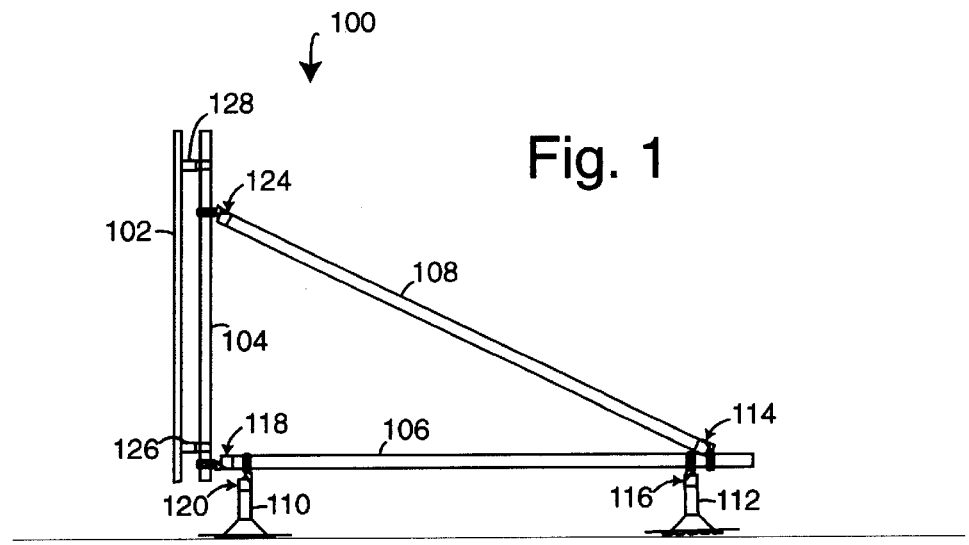
FIG. 1 is an end view of a single section of a roof screen system embodiment of the present invention shown mounted to a flat roof top.

FIG. 1 illustrates a roof screen system embodiment of the present invention, referred to herein by the reference numeral 100. Embodiments of the present invention use rigid aluminum framing members assembled with die-cast aluminum knuckles to create a bolt-together system that eliminates any need for welding. For example, aluminum framing members of 6063-T6 extruded aluminum outside diameters of 2.45" is useful.

The roof screen system 100 includes a screen panel 102 (shown on edge) mounted to a vertical framing member 104, a horizontal framing member 106, and a diagonal brace framing member 108. A pair of roof footers 110 and 112 hold the system 100 aloft a few inches above a building's roof.

A knuckle 114 connects the diagonal brace framing member 108 to the horizontal framing member 106. A similar knuckle 116 connects the horizontal framing member 106 to the top of the footing 112. Another knuckle 118 connects the horizontal framing member 106 to the vertical framing member 104. A knuckle 120 connects the horizontal framing member 106 to the top of the footing 110. A knuckle 124 completes the frame by connecting the vertical framing member 104 to the diagonal brace framing member 108. A bottom rail-clamp 126 and a top rail-clamp 128 attach the screen panel 102 to the vertical framing member 104. In some installations, it is preferable to use screen pails that have more than just two horizontal rails, and this permits more than just two rail-clamps to be used to secure the screen to each vertical framing member 104.

In some implementations of the present invention, it may be desirable to paint the screen panels 102 with advertising or other signs. Electrically lighted signs may also be bolted to the screen panels 102. In some installations, the system 100 could also act as a rooftop or ground-level safety fence. The appropriate local building codes will direct how such safety fence should be configured to pass inspection.

During operation, strong wind forces will blow laterally against the screen panel. Frontal winds (that come from the left in FIG. 1) will put the diagonal brace framing member in compression. Back winds (that come from the right in FIG. 1) will put the diagonal brace framing member in tension. The knuckles 114, 116, 118, 120, and 124, all allow bolt-on assembly and yet will steadfastly lock the framing member 104, 106, and 108 into a rigid triangular frame without requiring welding. Each knuckle allows the connection of one end of a framing member to anywhere along the length of another framing member. This permits the panel screen 102 to be vertically oriented even though the roof to which the footers are attached may be pitched.

Alternatively, the adjustability afforded by being able to slip the knuckles along the lengths of framing member can allow the framing member 104 to be locked in at some non-perpendicular angle. This could be useful where the system 100 is used to mount solar photovoltaic panels instead of panel screens 102. The angle of the solar photovoltaic panels presented to the sun could easily be adjusted as the seasons change.

Figure 2:
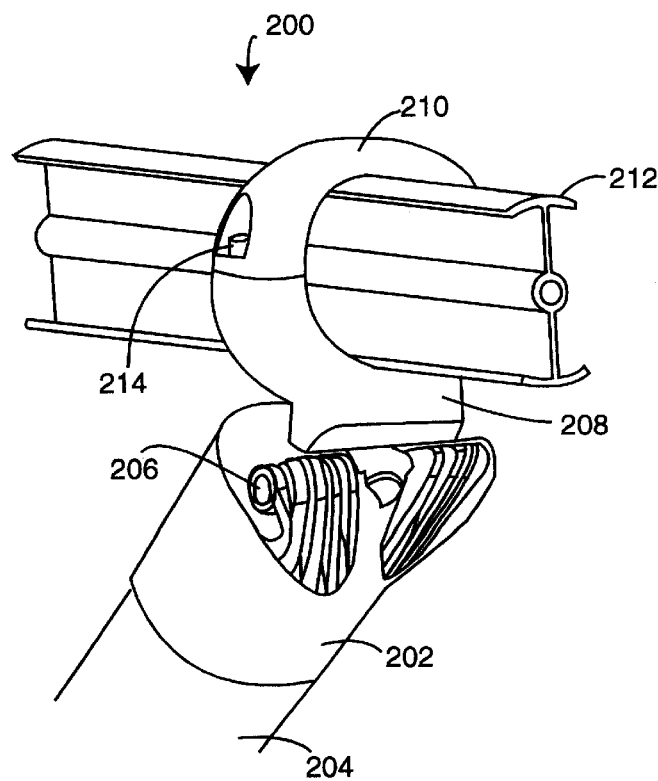
FIG. 2 is a perspective diagram of a pivotable beam clamp or "knuckle" assembly embodiment of the present invention shown connecting one end of one beam to a longitudinal section of a length of adjoining beam.

FIG. 2 illustrates a knuckle 200, and is similar to knuckles 114, 116, 118, 120, and 124 (FIG. 1). A single knuckle type can preferably be used in all five positions in FIG. 1. The knuckle 200 is preferably of all-aluminum construction and can be die-cast and machined. Alternatively, such knuckle 200 can be made of plastic, steel, stainless or other material that is compatible with long-term exposure to the sun and weather. A cap 202 fits over one end of a beam 204. A hinge pin 206 connects the cap 202 to a yoke 208 and clamp 210. A second beam 212 can accommodate the yoke 208 and clamp 210 anywhere along its longitudinal length. A bolt 214 is used to tighten the clamp 210 on the beam 212 and lock it in place. A bolt is passed through the cap 202 and into beam 204. As this bolt is tightened, it grips the inside of the beam.

The hinge pin 206 is such that beams 204 and 212 are free to pivot. Assembling three such beams and knuckles in a triangular frame will cause the whole assembly to lock into shape even though all the hinge pins are free to pivot. A triangle of just about any geometry can be formed by cutting the beams and sliding the knuckles to new positions. Such operations would be relatively easy for a worker to accomplish on a rooftop.

Figure 3:
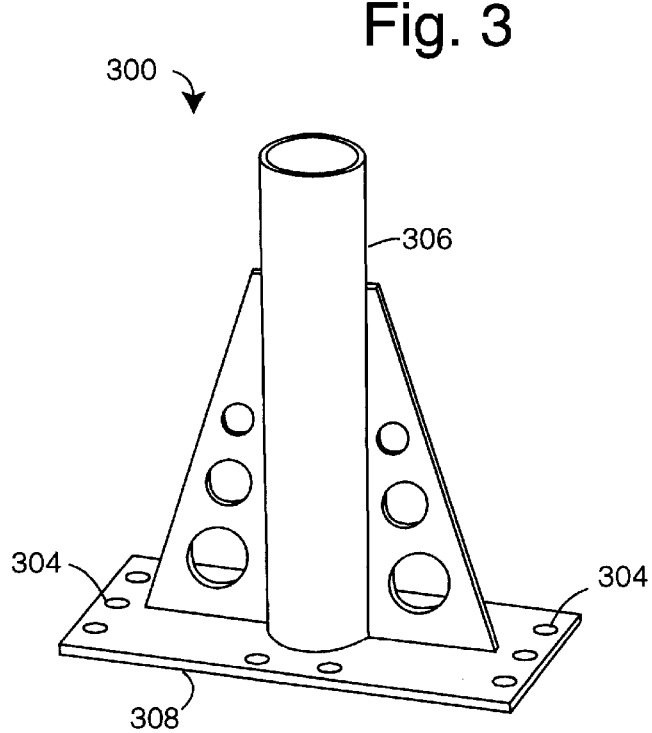
FIG. 3 is a perspective view of a roofing footer embodiment of the present invention as used in FIG. 1.

FIG. 3 represents a mild steel, hot dipped galvanized footer 300. Each triangular frame (FIG. 1) typically requires two footers, e.g., 110 and 112. A number of bolt holes 304 are provided to secure the footer 300 to a roof or other surface. A stem 306 is premanufactured-welded to the base 308 with two gussets.

Figure 4:
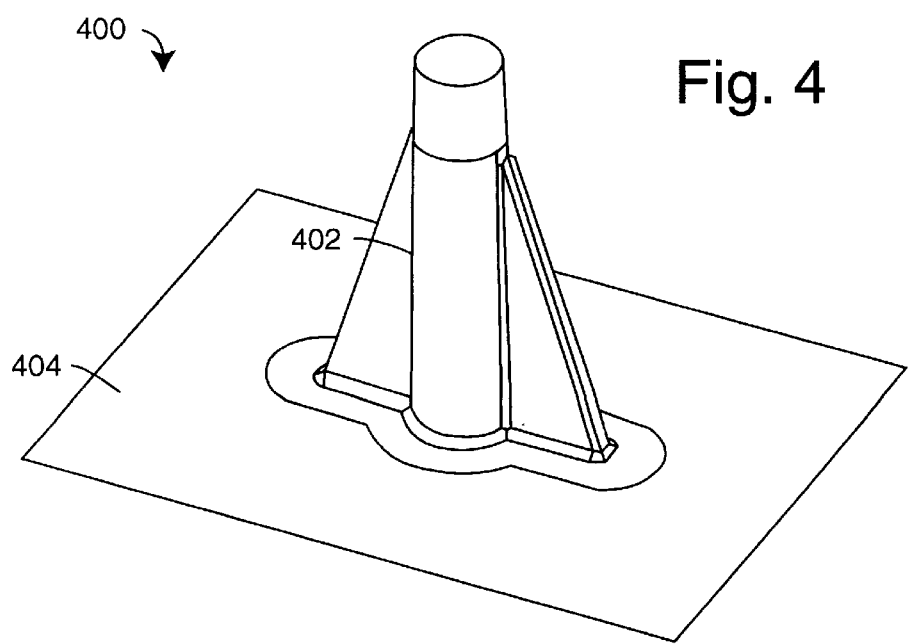
FIG. 4 is a perspective view of a foot flashing boot or roof-jack that slips over the footer of FIG. 3, to seal out weather and prevent roof leaks.

FIG. 4 illustrates a footer flashing boot 400 that is intended to slip over the footer 300. The flashing boot 400 is hollow with a bottom cone section that joins a top section. The top has a bolt hole in the center that allows a knuckle cap to be bolted on. The footer 300 is bolted first to the roof, then the flashing boot 400 is slipped over. A flat rubber washer is preferably used under such bolt and under such knuckle cap to seal out weather from the interior of flashing boot 400. The flashing can be constructed with a stem section 402 of neoprene rubber and a base section 404 of 0.020" aluminum sheet. The flashing boot 400 is typically sealed to a roof by generally accepted roofing methods and consistent with the specific roof system.

Figure 5:
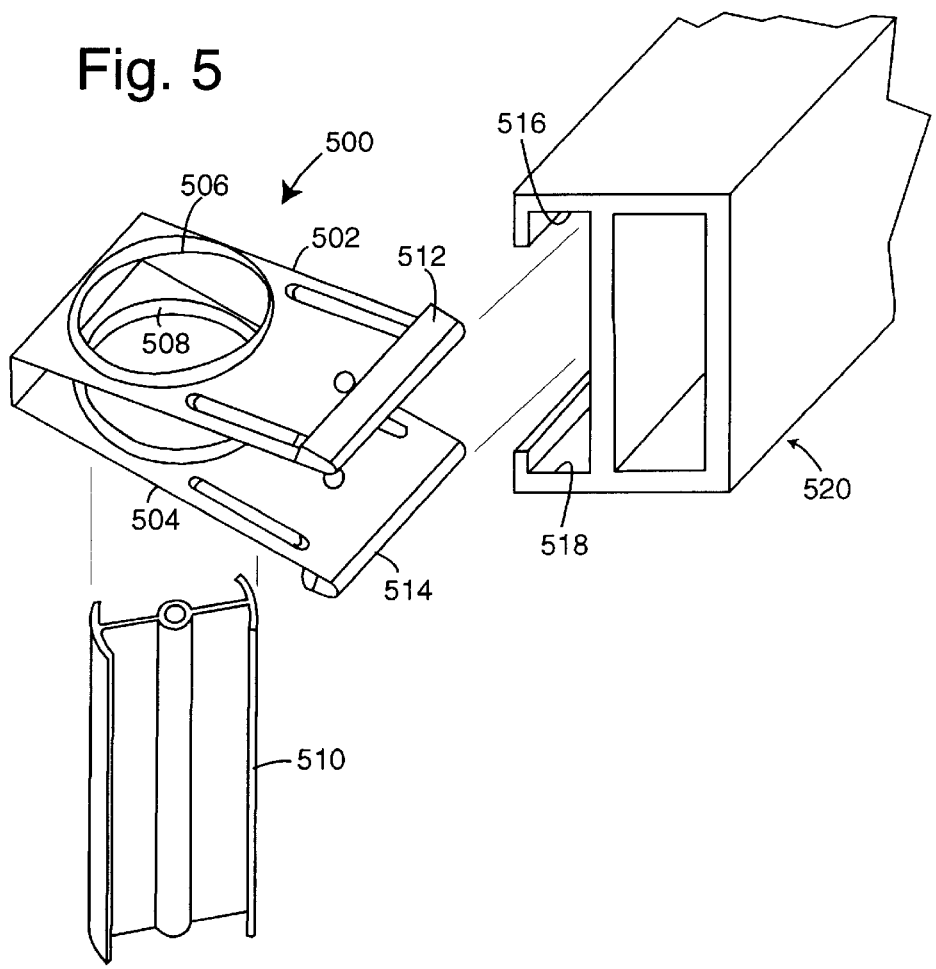
FIG. 5 is an exploded assembly view of how a rail clamp, rail, and vertical front beam of the frame of FIG. 1 can all be joined and locked together in embodiments of the present invention.

FIG. 5 illustrates a spring clip 500 that can be used to secure the screen panels 102 (FIG. 1) to the vertical framing member 104. The spring clip is made of stamped sheet metal in a V-shape with a flattened bottom. An upper wing 502 and a lower wing 504 are each provided with a beam hole 506 and 508, respectively. Such holes are sized to allow a beam 510 to slip through when the wings 502 and 504 are squeezed together, and to lock when released. A pair of upper and lower dog-ears 512 and 514 are shaped so they will snap and lock inside an upper and lower channels 516 and 518 in a rail piece 520. The spring clip is inserted into the open channel of the rail piece 520 by temporarily squeezing wings 502 and 504 together. Signs, solar panels, or screen panels can be attached directly to the rail pieces 520, e.g., like rail-clamps 126 and 128 (FIG. 1) are to screen panel 102.

Figure 6:
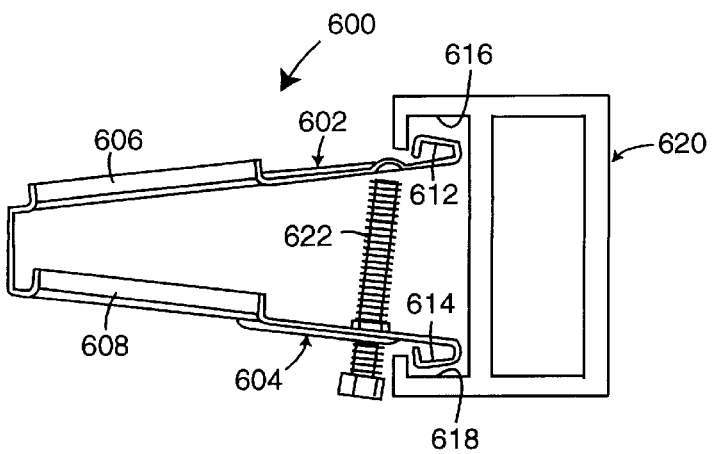
FIG. 6 is an end view of a rail clip being forced to lock inside a back side box channel of a rail with an open slot, a spreading bolt is shown forcing the wings of the rail clip apart.

FIG. 6 illustrates a rail clip 600 that can be used to secure the screen panels 102 (FIG. 1) to the vertical framing member 104. The rail clip 600 is made of stamped sheet metal in a V-shape with a flattened bottom. An upper wing 602 and a lower wing 604 are each provided with a beam hole 606 and 608, respectively. Such holes 606 and 608 are sized to allow beams, such as beams 204 and 212 (FIG. 2), and framing member 104 (FIG. 1), to just slip through. A pair of upper and lower dog-ears 612 and 614 are shaped so they can lock tightly inside an upper and lower channels 616 and 618 in a rail piece 620. A bolt 622 is screwed in to force the dog-ears 612 and 614 to expand and lock the clip 600 inside channels 616 and 618.

A typical installation proceeds as follows: The roof is marked with a crayon or spray paint where the corners of the roof screen will fall for the desired layout. Each corner must fall on a structural member. One footer is installed at each corner mark. Nylon strings are pulled between each corner footer to create a straight line for other intermediate footers. Such footers are installed at eight-foot intervals (maximum) along string lines. Each footer is positioned with the long side of the base perpendicular to the face of the roof screen. In other words, the footer should be positioned so that the wind load is against the short side of the footer base to allow an integral gusset to transmit the loads. It is crucial that any lag bolts used to attach the footers screw directly into the buildings structural members (studs or purlins) and be tightened securely. A secondary row of footers is similarly installed four to eight feet back from the primary row. Flashing boots are used on all footers with methods consistent with the type of roofing being used.

One frame is assembled at each corner by installing rubber gaskets onto the tops of the two footers for the corner frame. Caps are then installed over the footers and flashings. Metal backed rubber washers are placed on each cap bolt and the bolts with the washers are inserted through the caps into footers, but not yet tightened. A pivot bar, yoke and set screws are mounted onto each cap. A piece of the framing beam can be used as an alignment tool for the yokes. After the alignment tool is removed, the cap bolts can be tightened. A horizontal framing beam is assembled into the two yokes using the clamps and screws, but only loosely. Each such beam should extend four to six inches beyond each footer. The cap is installed over the end of the beam and the cap bolt threaded into the integral hole in the framing member, and now it can be fully tightened. The pivot bar and yoke are installed. The vertical framing beam is installed using the clamp and screws and is fully tighten. The beam is extended at least twelve inches higher than the desired roof screen height. A level is used to plumb the vertical member. The two clamps can then be tightened on the horizontal member to hold it all in place. A diagonal framing beam is measured and cut, and then installed using the same fittings as before.

The framing is then completed. A laser level, or transit, can be used to determine the top and bottom of the finished wall. The vertical members are marked at these points. A pair of nylon strings are pulled from corner to corner using the elevation marks to give a level reference point at the top and the bottom of the wall. For long runs, e.g., over sixty feet, it may be necessary to erect addition frames to prevent the string from sagging. Using the strings as reference points, the remaining frames are measured and cut. These are then assembled as before.

The panels and box-channel type rail are installed last. A laser level is used to shoot a line at the desired elevation for the top horizontal box-channel. At each frame, a number of clips corresponding to the number of rows of box-channel are installed starting with the clip at the top row. This clip is measured down from for subsequent clips. To install the rail clips, the clip is squeezed to slip around the beam. After installing the channel, the spreading bolt is used to secure it in place. The box-channel rows are installed by hooking the top edges to a clip, then pushing the bottom edge onto the clip, thus snapping them all into place. Splice plates are used to join box-channel sections end-to-end as necessary. The screen panels and any appropriate trim are then installed using the box-channels as attachment points.

In general, an embodiment of the present invention comprises frame assemblies spaced at a maximum of eight feet apart comprised of extruded aluminum framing member in conjunction with die-cast aluminum knuckle joint assemblies to form a triangular embodiment consisting of a vertical member, horizontal base member and a diagonal brace member. The vertical member varies in height to accommodate the desired wall height. The horizontal member can vary from four feet to eight feet depending on the roof structure. Each frame is supported by two mounting units called "footers". A weatherproofing assembly or "flashing boot" is installed over the footer and sealed into the roofing system. The pivoting action of the knuckle assembly along with the rotating action of the beam at the connection to the knuckle assembly allows for unlimited adjustments for straightening and leveling the wall across an uneven roof surface. Horizontal spanning members referred to as box-channels are mounted across the frame assemblies to facilitate the metal panel attachments. The box-channels are mounted to "clips" that are clamped to the vertical members at the appropriate height.

The footer support is a premanufactured welded steel part consisting of a base plate, a mast and two gussets. The base plate includes mounting holes for attachment to the structure. Lag bolts are used for attachment to wood framed structures. Expansion bolts are used for structural concrete decks. The mast includes a threaded hole in the top to accept the anchoring bolt for the "cap" portion of the knuckle assembly.

The flashing boot comprises a watertight assembly that nests over the footer. It has a flange that extends out onto the roof surface and is incorporated into the roofing system. The top of the flashing extends to the top of the footer mast, and is overlapped by a "cap" portion of the knuckle assembly. There are three material combination choices suitable for this flashing unit. A dead soft aluminum base flange with neoprene or EPDM rubber cone/tube.

Each knuckle assembly comprises three die-cast aluminum parts, four hardware pieces and two seals. The cap piece is installed over the tube end and the anchor bolt is threaded into the integral hole in the framing member. A threaded hole in the top of the footer mast serves as the anchoring point. This requires two seals. One is a metal backed neoprene washer that is simply installed onto the anchor bolt. This seal is compressed when the bolt is tightened causing the necessary seal. A secondary safety seal gasket is installed on the top surface of the footer mast. Such neoprene gasket compresses between the inside of the cap and the footer mast.

The pivot bar is inserted through the holes in the cap. One end is knurled causing a friction fit into the hole in the cap. The yoke is attached securely, but is still free to pivot on the axis of the pivot bar. The final piece necessary to complete the assembly is the clamp. This piece is secured by means of two bolts. When tightened completely, it secures the framing beam in place.

The framing members are typically 6063-T6 extruded aluminum. The outside diameter of the framing member always stays the same, about 2.450". When design loads are increased, the wall thickness increases for added strength.

The box-channel clip is preferably a zinc plated sheet metal part that clamps around the vertical beam at the appropriate height to hold the box-channel in place. It is secured by means of a bolt threading into a Pem-Nut which spreads the upper and lower wings, locking them into the box-channel.

The box-channel itself is installed horizontally between frames. The number of rows required is determined by the design load and the panel spanning capability. The channel is spring locked to the clip by hooking the top edge first, then pushing the bottom causing the clip tabs to flex far enough to snap in place. The spreader bolt is then screwed in to lock the clip onto the box-channel. Splice plates are used for end to end attachment of the channel.

The panels are installed across the box-channels and attached by means of self drilling through fasteners, or concealed retainer clips.

Although particular embodiments of the present invention have been described and illustrated, such is not intended to limit the invention. Modifications and changes will no doubt become apparent to those skilled in the art, and it is intended that the invention only be limited by the scope of the appended claims.

The invention claimed is:

1. A roof-screen framing system, comprising:
   a plurality of triangular frames of extruded-metal beams and including a front frame beam, a bottom frame beam, and a diagonal brace beam;
   a plurality of pivotable clamps, wherein one each is used to join an end of said front frame beam, bottom frame beam, and diagonal brace beam by clamping it to a longitudinal section of an adjoining beam length, and such that a whole assembly causes each triangular frame to lock together;
   a plurality of parallel rails mounted one above the other to said front frame beam; and
   a pair of roof footers for each one of the plurality of triangular frames that is connected to support a corresponding said bottom frame beam with one each of the plurality of pivotable clamps.

2. The roof-screen framing system of claim 1, wherein:
   the plurality of triangular frames is such that said front frame beam is vertically oriented, said bottom frame beam is oriented parallel to a roof surface to which the pair of roof footers are mounted, and said diagonal brace beam maintains said vertical orientation of said front frame beam in the presence of wind loads.

3. The roof-screen framing system of claim 1, wherein:
   the plurality of pivotable clamps is such that each comprises a beam cap that is hinged to a yoke and clamp, and said beam cap has a center bolt-hole for a fastener.

4. The roof-screen framing system of claim 1, wherein:
the plurality of pivotable clamps is such that each comprises a beam cap that is hinged to a yoke and clamp, and said yoke and clamp allow a slip-joint, and locking to a longitudinal length of said front frame beam, bottom frame beam, and diagonal brace beam.

5. The roof-screen framing system of claim 1, further comprising:
a clip for holding said parallel rails to said front frame beam, and that is formed of sheetmetal bent into a V-section with a beam-hole in each of two wings, and further including a locking dog-ear that snaps into a respective channels inside a back surface of each of the plurality of parallel rails.

6. The roof-screen framing system of claim 5, further comprising:
a spreading bolt disposed in the clip that pushes said two wings apart to force said dog-ears to lock into said respective channels.

7. The roof-screen framing system of claim 1, wherein:
the plurality of pivotable clamps is such that each comprises a die-cast aluminum beam cap, yoke and clamp, and a hinge pin that provides for a pivoting connection between said beam cap and yoke.

8. The roof-screen framing system of claim 1, wherein:
each of the parallel rails includes a box channel on a back side with an open slot, and that has a front side to which a number of panels can be mounted.

9. The roof-screen framing system of claim 1, further comprising:
a screening panel mounted to the plurality of parallel rails and that obscures the sight of mechanical equipment mounted to a building roof-top.

10. The roof-screen framing system of claim 1, further comprising:
an advertising panel mounted to the plurality of parallel rails and tilted for viewing by the public by adjusting the plurality of pivotable clamps to increase exposure.

11. The roof-screen framing system of claim 1, further comprising:
a solar panel mounted to the plurality of parallel rails and tilted back by adjusting the plurality of pivotable clamps to increase sun exposure.

12. The roof-screen framing system of claim 1, wherein:
each one of the plurality of roof footers includes a base with pre-drilled holes that allow for attachment to the roof of a building, and a top section able to fit inside a cap part of one of the plurality of pivotable clamps and bolt to it.

13. The roof-screen framing system of claim 12, wherein:
each one of the plurality of roof footers further includes a flashing boot that fits over said base and top section to seal out weather and roof leaks.

14. A knuckle beam-connector assembly, comprising:
a beam cap for slipping over an end of a first beam section and anchoring to it;
a yoke and clamp providing for a slip-joint connection to a longitudinal section of a length of a second beam section and that can be locked in place; and
a hinge connection that joins the beam cap and the yoke such that they can pivot.

15. A beam-to-rail attachment clip, comprising:
a sheetmetal body bent into a V-section with a pair of opposing wings;
a beam-hole in each of said opposing wings; and
a locking dog-ear at each distal end of each said opposing wings for providing a locking mechanism that snaps into a respective box-channel.

16. The beam-to-rail attachment clip of claim 15, further comprising:
a spreading bolt disposed in the sheetmetal body that pushes said opposing wings apart to force said dog-ears to lock into said box-channel.

\* \* \* \* \*